Dec. 28, 1965    A. L. JAMISON    3,225,959
CARRIER FOR CONTAINERS
Filed May 15, 1963    4 Sheets-Sheet 1
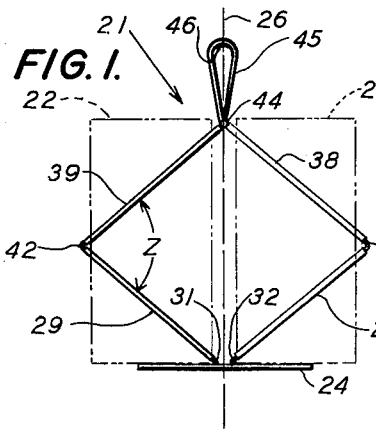
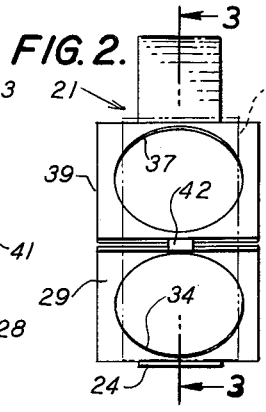
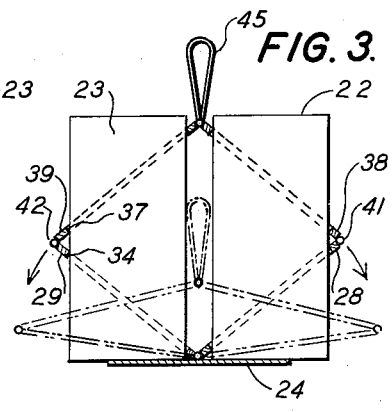
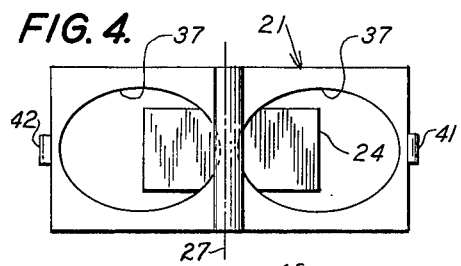
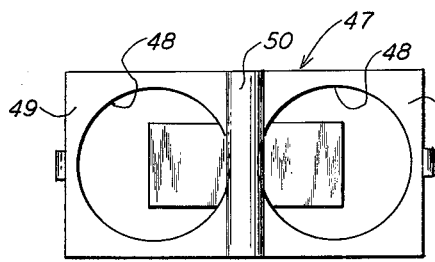
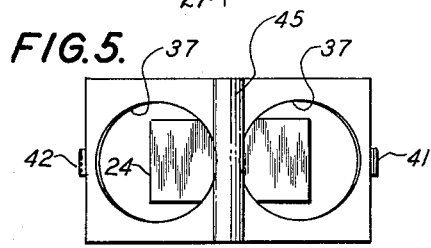
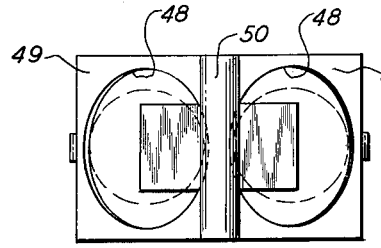
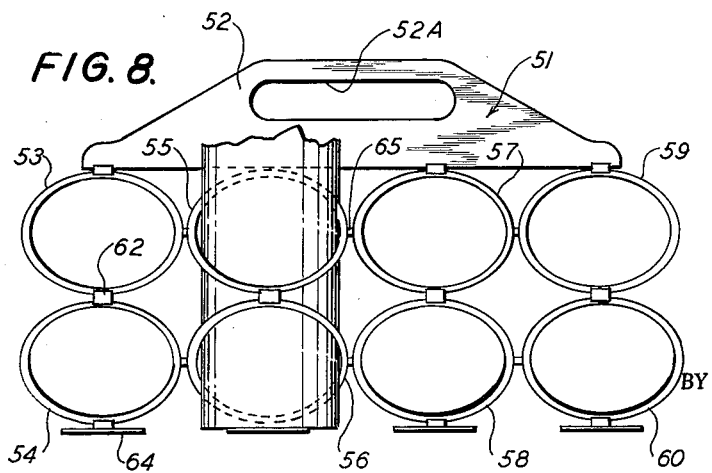
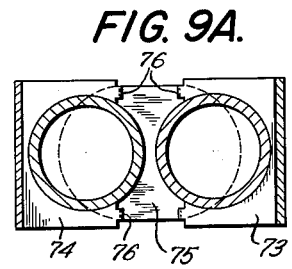
INVENTOR:
ALBERT L. JAMISON
BY W. J. Gribble
ATTORNEY Dec. 28, 1965 A. L. JAMISON 3,225,959
CARRIER FOR CONTAINERS
Filed May 15, 1963 4 Sheets-Sheet 2
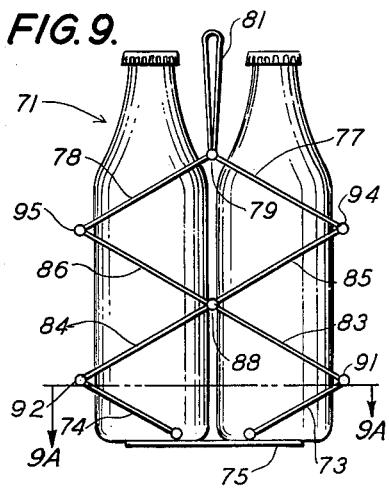
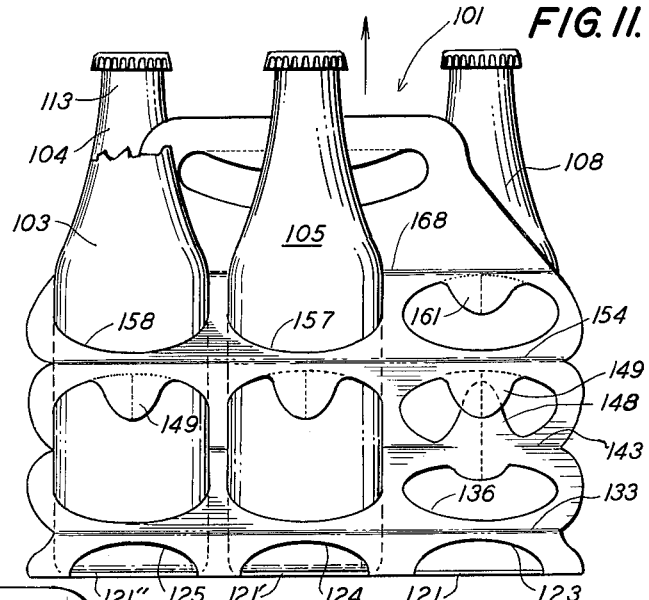
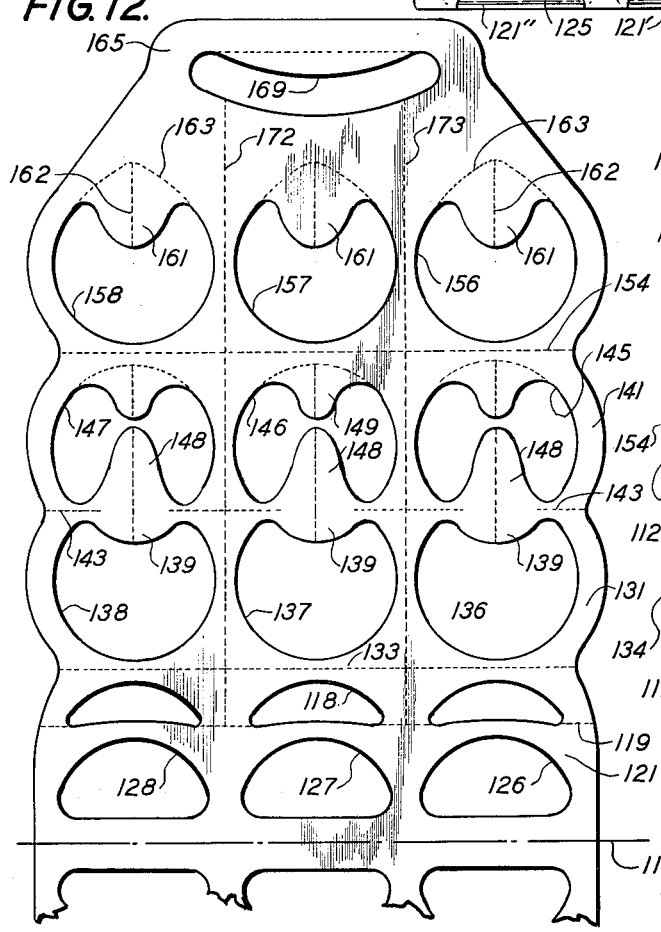
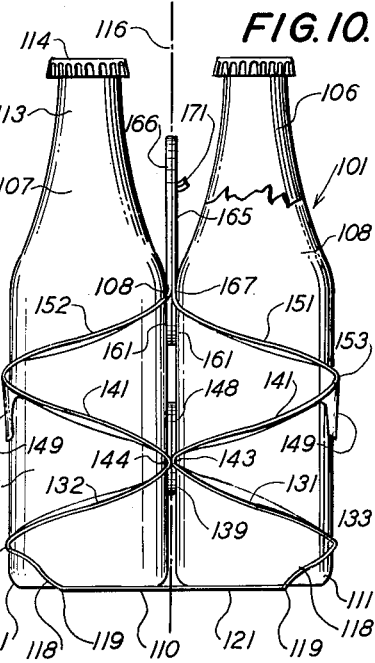
INVENTOR:
ALBERT L. JAMISON
BY
W. J. Gribble
ATTORNEY

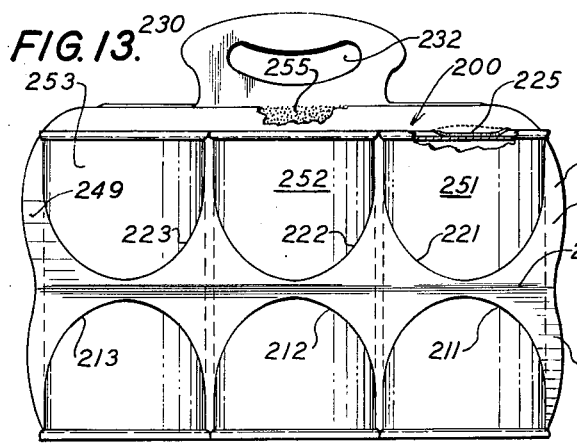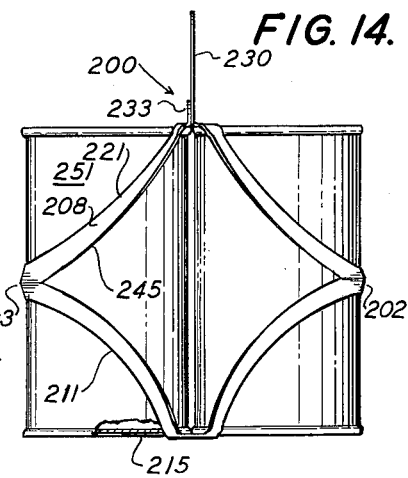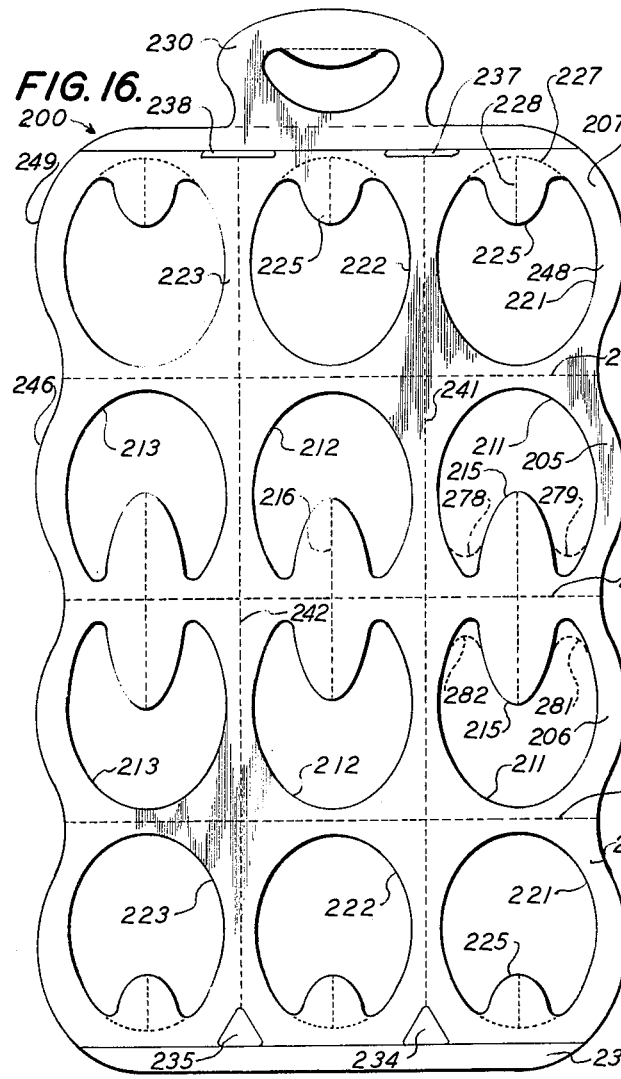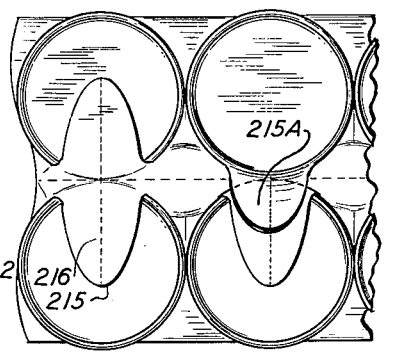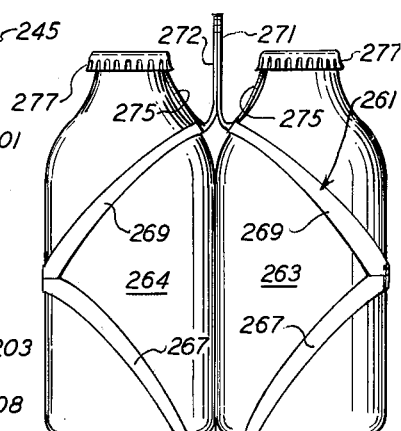

Dec. 28, 1965 A. L. JAMISON 3,225,959
CARRIER FOR CONTAINERS
Filed May 15, 1963 4 Sheets-Sheet 4
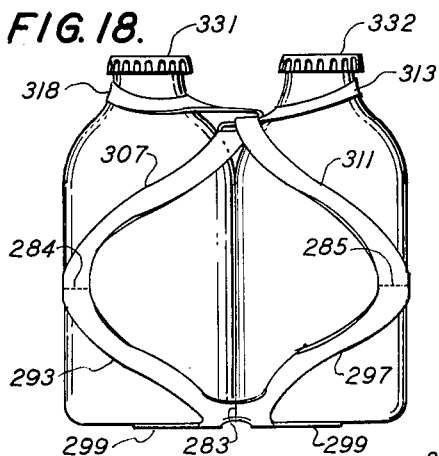
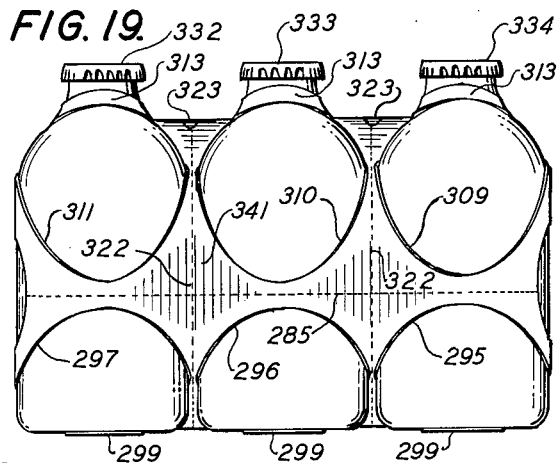
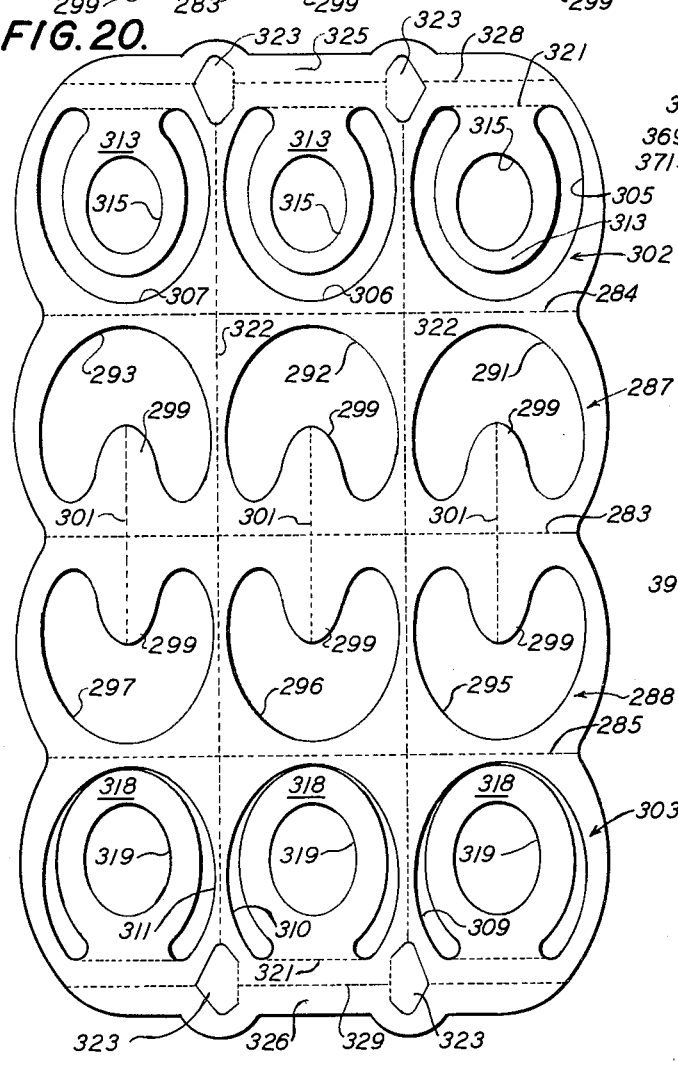
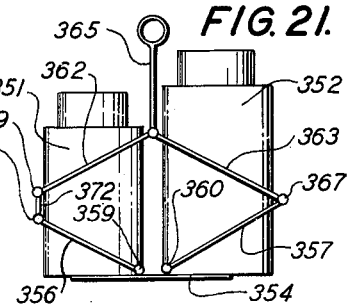
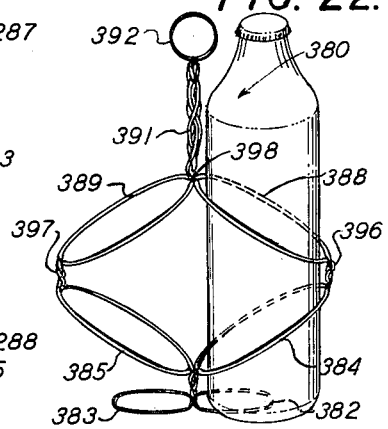
INVENTOR:
ALBERT L. JAMISON
BY
W. J. Gribble
ATTORNEY

United States Patent Office 3,225,959
Patented Dec. 28, 1965

3,225,959
CARRIER FOR CONTAINERS
Albert L. Jamison, Whittier, Calif., assignor of one-third to Byron V. Curry, Arcadia, Calif., and one-third to Arthur B. Willis, Newport Beach, Calif.
Filed May 15, 1963, Ser. No. 280,536
6 Claims. (Cl. 220—102)

The invention relates to carriers for containers and more particularly to carriers for small groups of similarly oriented containers such as beverage cans and bottles.

A constant goal in merchandising is to package consumer products in multiple units or groups that are attractive to and convenient for the consumer and at a cost within the profit structure of the merchandise. The packaging industry is continually testing and introducing new packaging concepts with this objective as their goal. The patent literature is replete with inventions concerning the packaging of two, four, six or more units of a single product grouped together for plural sale. Such packages increase total sales volume by making attractive consumer purchase of plural items. In the beverage field such patents are exemplified by the Patent No. 2,522,950 issued to M. W. Keith, September 19, 1950; and Patent No. 2,804,234 issued to E. P. LaChance, August 27, 1957. These patents disclose carriers that package six similarly oriented bottles.

Many like inventions and other developments never reach the market because they are economically unpracticable, lack consumer appeal or do not lend themselves to conventional packaging practices and machinery. I have invented a carrier and a carrier and container package adapted to package bottles, cans or other containers. The carrier may be made from economical flat materials such as paper or sheet plastic, that is easy to carry, can be filled upon present day assembly lines and grips the containers firmly when being carried. The carrier of my invention is attractive in appearance and may be used over and over. The invention contemplates a carrier for supporting a pair of containers arranged in side-by-side upstanding relation, the carrier comprising a floor member for restricting downward motion of each container, and a pair of first girdles articulately attached to the floor member adjacent a central line of the floor member, the girdles sloping oppositely outwardly and upwardly from the floor member. Each first girdle encircles a container of the pair. A pair of second girdles is articulately attached each to a first girdle on opposite sides of a central axis of the floor member and each encircles adjacent containers on opposite sides of said axis. The second girdles slope oppositely inwardly and upwardly from attachment to the first girdles. The attachment may be by means of hinges applied to the floor member and the girdles, or the attachment may be formed integrally with the floor member and the girdles, such as a so-called "living hinge" when the member and girdles are fabricated of a sheet plastic. The attachment is such that the first and second girdle openings on each side of the carrier are vertically aligned.

Each girdle has a circumference exceeding that of a right section of each container and is adapted to extend about the container. In the preferred embodiment, the second girdles are articulately attached together at their upward portions. A handle is secured to the second girdles. The girdles are so aligned vertically that an upward pull on the handle changes the attitude of the aligned girdles with respect to one another and with respect to each container within an aligned pair of girdles so that each girdle circumference exerts a frictional restraint upon each container circumference, restricting container movement relative to the carrier in all directions.

The floor members for restricting downward motion of the containers are joined across the central axis so that tension forces are distributed equally on both sides of the container through the floor portions to the opposite first girdles. The carrier and package of the invention thus adapts to any even number of similarly oriented containers. The containers need not be of the same outward configuration within the same carrier package. In the best embodiment, the carrier is one made of linear polyethylene or a similar plastic sheet. The carrier may also be extruded as a shaped tubular form and then punched on a mandrel to form the girdle apertures. While the invention may be practiced with paper, the plastics referred to above have the advantage of easy sterilization, reclamation of scrap in fabricating, and material salvage of used carriers.

The inventive concept is applicable to carriers of sheet material, rigid rings, flexible girdles, or malleable wire. The latter material at present seems best for heavier containers of one quart or more.

The carrier of the invention may be combined with a plurality of containers to form a package by either of two conventional packaging methods. The carrier may be placed in the conventional filling tray and containers dropped or otherwise inserted into the carrier as it stands in the tray. Alternatively, the containers may be grouped upon a flat lay-out of the carrier and the carrier raised about the containers and may be sealed or bound in locked position. Present machinery may accomplish either of these packaging methods with little or no machine alteration.

These and other advantages of the invention will be apparent from the following detailed description and the accompanying drawing in which:

FIG. 1 is an end elevation showing a carrier in accordance with the invention;

FIG. 2 is a front elevation of the embodiment of FIG. 1;

FIG. 3 is a schematic sectional elevation taken along line 3—3 of FIG. 2;

FIG. 4 is a plan view of the empty carrier shown folded for loading;

FIG. 5 is a plan view of the carrier in extended position as when loaded with containers;

FIG. 6 is a plan view of an alternate embodiment of the invention shown folded in loading position;

FIG. 7 is a plan view of the embodiment of FIG. 6 in extended position;

FIG. 8 is a schematic front elevation of a further alternate embodiment of the invention comprising articulately connected rings;

FIG. 9 is a schematic end view of an embodiment of the invention adapted to use with relatively tall containers;

FIG. 9A is a sectional plan view taken along line 9A—9A of FIG. 9;

FIG. 10 is an end elevation of an embodiment of the invention made from sheet material;

FIG. 11 is a front elevation, with one container removed, of the embodiment of FIG. 10;

FIG. 12 is a flat sheet material pattern for the carrier of FIG. 10;

FIG. 13 is an end elevation of an alternate embodiment of the invention adapted for use with beaded containers;

FIG. 14 is a front elevation of the embodiment of FIG. 13;

FIG. 15 is a bottom plan view of the embodiment of FIG. 13;

FIG. 16 is a flat sheet material pattern for the carrier of FIG. 13;

FIG. 17 is an end elevation of a carrier similar to that of FIG. 13, but adapted for use with relatively short bottles;

FIG. 18 is an end elevation of a still further alternate embodiment of the invention having means for securing the bottle necks;

FIG. 19 is a front elevation of the embodiment of FIG. 18;

FIG. 20 is a flat sheet material pattern for the carrier of FIG. 18;

FIG. 21 illustrates a carrier for containers of unlike sizes;

FIG. 22 is an end elevation of a carrier of wire in accordance with the invention; and FIG. 23 is a cross-sectional view of a preferred form of wire for carriers.

The embodiment of the invention illustrated in FIGS. 1–5 comprises a carrier 21 for a single pair of containers 22, 23. The carrier has a floor member or base 24 that precludes downward movement of similarly oriented containers 22, 23 (shown in broken lines in FIG. 1) within the carrier. The containers are aligned on opposite sides of a central plane (the edge of which is indicated by line 26 of FIG. 1) and bisecting the carrier in a floor member central axis 27 (see FIG. 4). A pair of first girdles 28, 29 extend oppositely from hinges 31, 32 fixed to the base near its midpoint. Each of the first girdles extends upwardly and outwardly from its hinge and is free to move arcuately with respect to the base.

As can be seen from FIG. 2, first girdle 29 has a girdle aperture 34 through which container 23 extends to the base. The circumference of aperture 34 is slightly greater than the circumference of a right section of container 23. Therefore, when the girdle is at a lesser angle to the horizontal, the opposed points of the aperture closest to and farthest from the central plane are displaced from the container periphery.

The same is true of a girdle aperture 37 in each of the pair of second girdles 38, 39 articulately fixed one to the outer portion of each first girdle by hinge means 41, 42, respectively. The second girdles extend upwardly and inwardly from the first girdles and may be articulately joined to each other at their tangent edges. The juncture may be a hinge means 44, such as a flexible tab or miniature hinge. When the carrier is made from a single plastic sheet, the means may be an integral "living hinge" preformed in the sheet.

A handle 45 is fixed to the upper inner portions of the second girdles. The handle may have any configuration convenient for gripping, such as the loop 46 shown in FIG. 1. The loop affords a finger lift for the carrier, which is ample for a carrier with only two containers.

The carrier shown in FIG. 1 may be top-loaded by inserting a container through each of the second girdles and then through each of the first girdles to rest upon base 24. Conventionally, the loading operation takes place while a plurality of carriers are confined in a shallow case or tray that moves along a conveyor line. Containers are dropped into the carriers within the case as the trays progress along the line. With the carriers oriented within the case so that the angle Z between vertically aligned girdles approaches zero, the girdle apertures of 37, 34, for instance, offer an open path to the dropped container.

The weight of the containers puts the carrier in tension when the handle is raised. This tension is distributed from the base through the girdles and their attaching hinges. The tension force causes the first and the second girdles to diverge, increasing angle Z. Depending upon its shape, i.e., whether circular or elliptical, the girdle aperture tends to contact a greater or lesser portion of a container periphery when handle 45 is raised. The containers remain firm on the base.

As the handle is drawn upwardly, the girdle aperture attitude changes with respect to the vertical axis of the container and the aperture circumference grips the periphery of the container. In the carrier of FIGS. 1–5 the periphery of the container is gripped in two different zones. The same is true of carriers with a plurality of containers in each row, that is, on each side of the central plane. Balance to effectuate the gripping action is achieved because the girdle pairs on either side of the central plane move together. Therefore, the weight of the containers imposed upon the base by the lift forces on the handle results in equal inward displacements of the opposed joined outer edges of the first and second girdles, effectively binding or gripping the containers in position in the carrier.

In addition to the compressive grip against the outer portions of each of the containers in a row the girdle periphery may, by proper design, be brought into binding contact with nearly 360° of the container periphery in the two girdle zones. As shown in FIGS. 4 and 5, apertures 34 of each first girdle pair and apertures 37 of each second girdle pair are elliptical. The major diameter of the ellipse extends perpendicular to central plane 26. The minor diameter of the ellipse is approximately equal to the largest diameter of the container. Thus, when carrier 21 is in the folded, or loading, position of FIG. 4, in which angle Z approaches zero, containers may be easily dropped or otherwise inserted into the first and second girdles on opposite sides of the central plane. When handle 45 is raised after the carrier is loaded, angle Z increases so that the ellipses in plan appear as circles matching a right section of the container, and thus make contact at all girdled points of their periphery with the cylindrical containers within the apertures. Thus, two different zones of the container periphery resist downward and horizontal displacement of the containers within the carrier. In practice, during lift there is little need for the base or floor means for restricting vertical motion of the containers. The gripping action of the girdles is sufficient to support the containers while being carried.

FIGS. 6 and 7 illustrate in plan view a carrier in which the girdle apertures of the first and second girdles are circular. A carrier 47 has circular apertures 48 in each of its first girdles (not shown) and second girdles 49. In FIG. 6 the carrier is in flattened or loading position. Apertures 48 appear as circles whose diameters exceed the diameter of a right section of the container by a substantial increment. Carrier 47 must therefore be slightly larger than carrier 21 of the first embodiment.

In FIG. 7 an upward force has been exerted on handle 50, changing the attitude of second girdles 49 such that apertures 48 appear as ellipses with major diameters parallel to the central plane dividing the carrier. The minor diameter of the apparent ellipse now equals the diameter of the container and gripping contact is imposed upon the container at the two points of the ellipse on the apparent minor diameter.

The principles described above are also applicable to the carrier 51 illustrated in FIG. 8. Two rows of aligned first and second girdle pairs are disposed on either side of a central vertical plane coincident with a handle portion 52. Only the girdle pairs on one side of the vertical plane are visible in the figure. Each of a plurality of upper girdles 53, 55, 57, 59 is joined by a hinge means 62 to one of a plurality of lower girdles 54, 56, 58, 60 at their common points remote from the vertical plane. Each first girdle is fixed to a base 64 that acts to restrain downward motion of a container within the carrier. Preferably the adjoining first and second girdles in a row are attached by links 65 at their points of tangency. The links stabilize the package against horizontal motion of containers.

The girdles of the embodiment of FIG. 8 are rigid links that may be made from cylindrical material formed into loops. The cylinders may be solid or hollow. If the girdles are of rigid material, the containers during lift are restricted at the points on the container periphery nearest to and most remote from the central plane. This is particularly true if the girdles are circular. The binding forces by which the bottles or cans within the carrier are secured therein is imposed when the downward force of carrier weight imposed upon base 64 is opposed by an upward force upon the handle. The attitude of the articulately joined girdles with respect to the container vertical axis is altered by the lifting force. Change in attitude forces the two points in the girdle periphery into binding contact with the container within the aligned girdles. An effective carrier within the concept of the invention may therefore be formed from girdles of either flat or round material, depending upon their orientation with respect to one another.

Binding contact at more than two peripheral points may be achieved if the loops comprising the girdles are elliptical, as illustrated by the apertures 37 of FIGS. 1–5. The ellipse configuration must be calculated upon the factors of container diameter (if the container is cylindrical) and the angle that the girdle makes to a horizontal plane when the girdle is in binding contact with the container.

Handle 52, while shown as a sheet, may be of any configuration commensurate with its function of exerting an upward force upon each of the second girdles at the point of which they are articulately joined. Finger slot 51A in the handle provides for a full hand grip that is preferred for carrying a carrier with eight containers. If the attachment between handle and girdles is of a hinged type, the carrier of FIG. 8, like the carrier of FIG. 1, may be folded flat, facilitating shipment and handling.

For several categories of tall containers, such as twelve and sixteen ounce bottles, it is desirable to grip the container periphery at more widely separated vertical points. Therefore, a container 71 shown in FIGS. 9 and 9A has a first girdle pair 73, 74 articulately joined to a base 75 by hinge means 76 and a second girdle pair 77, 78 articulately joined at their inner edges by a hinge means 79 to which a handle 81 is also attached. First girdles 73, 74 extend outwardly and upwardly from their attachment to the base. Second girdles 77, 78 extend downwardly and outwardly from their attachment to the handle and each other. The first and the second girdle pairs are articulately joined by third and fourth girdle pairs 83, 84 and 85, 86. Such juncture enables the second girdle pair to be displaced upwardly upon the container periphery for greater carrier stability. Third and fourth girdle pairs are articulately joined by a hinge means 88 at the central point of the carrier. The lower and outer portions of girdles 83, 84 are joined to the upward and outward portions of the first girdles by suitable hinging means 91, 92. Girdles 85, 86 are articulately joined by hinge means 94, 95 to second girdles 77, 78. In effect, the carrier 71 is a compound girdling structure in which the gripping and stabilizing effects of the embodiment of FIG. 1 are multiplied.

In FIGS. 10 and 11 a carrier 101 adapted for use with six similarly oriented containers is preferably made from a single sheet of oriented plastic material such as linear polyethylene. Similar plastic sheet material such as polystyrene may also be used. The carrier 101 encompasses a plurality of conventional glass bottles 103 through 108. Each bottle has a base 110 and a heel portion 111 directly above the base. The bottle rises in a substantially cylindrical central portion 112 to a neck 113 whose top opening, or mouth, is sealed by a conventional crown cap 114. The bottles are aligned in two parallel rows of three bottles each on opposite sides of a central plane 116. The central plane is indicated by a broken line x—x in FIG. 10. The carrier is symmetrical about the central plane, and therefore in FIG. 12 only one-half of the pattern lay-out is shown. The lay-out is duplicated on each side of the indicated center line 117 of the carrier bottom.

Each side of carrier 101 has a bottom girdle plane 118 extending upwardly and outwardly from a hinge line 119 of a carrier bottom 121. Girdle plane 118 has three equally spaced girdle apertures 123, 124, 125, each of which girds about bottle heel 111. The carrier bottom has equally spaced bottom apertures 126, 127, 128 on either side of center line 117. The configuration of the bottom apertures is a matter of choice so long as sufficient bottom material is left to support the bottles during initial lift of the carrier. A second girdle plane on either side of the carrier, such as the planes 131, 132, extends upwardly and inwardly from respective hinge lines 133, 134 scored in the flat sheet when the sheet is formed. Each second girdle plane has a plurality of shaped apertures 136, 137, 138 through which a container may be inserted. The aperture may be semi-elliptical, with the long axis of the ellipse extending perpendicular to central plane 116. Each aperture of the second girdle plane has extending into it a guide tab 139. The guide tabs space apart the adjacent rows of bottles as well as acting to guide the bottle bottoms into proper orientation when the carrier is loaded.

Each side of the carrier has a third girdle plane 141, 142 that extends upwardly and outwardly from respective inner hinge lines 143, 144. The girdles of the two sides of the carrier are joined along the hinge line prior to loading by an appropriate adhesive or by heat sealing. Ultrasonic heat may be utilized to effect the bond between the two hinge lines.

Each of the third girdle planes 141, 142 has three girdle apertures 145, 146, 147 incised therein. All of the girdle apertures of the carrier are aligned in their respective rows with lower apertures so that a container may be inserted into each vertically aligned aperture set. The apertures 145–147 are of generally elliptical configuration. An inner tab 148 and an outer tab 149 extend into each aperture 145–147. A vertical score line 151 (indicated by broken lines) extends from tab 139 of each aperture to the tip of tab 148 of each aperture. Each tab 149 is scored vertically at score line 152. Line 152 terminates at an arcuate score line 153 that is substantially a continuation of the periphery of each aperture 145–147.

As can be seen from FIG. 10, tabs 148 extend upwardly from the hinge line 143 or 144 between bottles of adjacent rows, whereas the tabs 149 extend downwardly on the outer periphery of each container. The score lines of each tab effect a hinge that frees each tab to conform to the contour of the respective container periphery in a manner compatible with the general slope of the respective girdle plane.

A fourth girdle plane 151, 152 extends inwardly and upwardly from hinge lines 153, 154, respectively, at the juncture of the third and fourth girdle planes. Each fourth girdle plane has three bottle-receiving girdle apertures 156–158 that are each aligned with an aperture in the lower girdle planes. Each girdle aperture 156–158 has a protruding tab 161 having a vertical score line 162 and an arcuate score line 163. The tabs 161 act to guide the initial insertion of the containers into the apertures and to separate the peripheries of containers in adjacent rows. Each fourth girdle plane continues upwardly in a handle portion 165, 166, respectively, from a hinge line 168. The entire abutting surfaces of the handle portions may be sealed together in any convenient fashion, like heat sealing. A finger cut-out 169 in the upper portion of the handle is shaped so that a double flap 171 may be bent upwardly when fingers are thrust into the cut-out, forming a curving grip for the fingers.

Each girdle plane is scored between adjoining girdle apertures such that a straight score line extends from hinge line 119 at the bottom of the carrier to the handle portion at the top of the carrier. The vertical score lines 172, 173 intersect the horizontal hinge lines and form a semi-rigid flat between the bottles of each row. This flat area tends to resist horizontal thrust and effectively separates the bottles, despite the relatively thin sheet material from which the carrier is preferably made.

Polyethylene sheet plastic of 10 mil thickness has proved to be effective in constructing a bottle carrier in accordance with the invention. The material has sufficient body to restrain motion of the containers within the carrier, while having sufficient resiliency to fit snugly about the container periphery at each girdle plane without permanent deformation of the material. Such material characteristics make it possible for the carrier of the invention to adapt to various slightly dissimilar containers without the need of changing aperture configuration or the design angle of girdle plane divergency. Such material is also easy to sterilize in order to reuse the carriers. The carrier of FIGS. 10–12 may be used with bottles of from six to twelve ounces so long as the containers are of generally cylindrical configuration and do not vary substantially in diameter. Containers of non-cylindrical right section may be combined with this particular carrier embodiment by slightly altering the girdle aperture configurations.

FIGS. 13–16 illustrate an embodiment of the invention that may be combined with six containers, although the same inventive concept may result in a carrier for even numbers of containers more than or less than six. Like the embodiment of FIG. 10, the instant embodiment is preferably made from a sheet material such as polyethylene. The carrier may be made from a flat sheet 200 that is die-cut and scored, as shown in FIG. 16.

In FIG. 16 a plurality of girdle planes on either side of a central fold line 201 have similar ellipse-like girdle apertures. The girdle planes are separated by hinge lines 202, 203 such that opposed first girdle planes 205, 206 lie on opposite sides of central hingle line 201. Second opposing girdle planes 207, 208 extend from hinge lines 202, 203, respectively.

Girdle planes 205 and 206 have similar girdle apertures 211, 212, 213 which are paired so that they are in substantial alignment. A tab 215 protrudes into each aperture. A score line 216 extends between the extremities of the adjacent tabs, crossing hinge line 201. The tabs extend away from the central hinge line.

Second girdle planes 207, 208 have similar preferably die-cut girdle apertures 221, 222, 223, respectively, aligned with the apertures 211, 212, 213 of the first girdle planes. Each of the girdle apertures of the second girdle plane has a tab 225 protruding into the cut-out area toward the hinge line between the first and second girdle planes. An arcuate score line 227 extends from the juncture of the tab with the periphery of the aperture in a substantial continuation of the aperture configuration. A central score line 228 bisects the tab between its extremity and arcuate score line 227.

A handle portion 230 with a finger hole 232 is attached to second girdle plane 207. An attaching band 233 extends from second girdle plane 208. Relief holes 234, 235 are incised in the second girdle plane 208 adjacent attaching band 233 and between adjacent apertures of the plane. Relief cuts 237 and 238 reside in girdle plane 207 adjacent the handle portion in line with the spaces between the apertures of that girdle plane. Score lines 241, 242 extend between hole 234 and relief cut 237 and hole 235 and relief cut 238, respectively. The score lines 241, 242 cross the hinge lines 201, 202, 203.

The material from which the carrier is made is preferably such that the material cut from the apertures is reclaimable. For the same reason the sides 245, 246 of the carrier are patterned in undulating fashion substantially paralleling the contour of the apertures reducing the amount of material in the carrier. The borders of each girdle plane thereby comprise girdle bands 248, 249 of substantially uniform thickness. This particular side treatment is applicable to all carriers of the invention made from flat sheet material.

Flat sheet 200 of FIG. 16 is designed to combine with six beaded containers such as the conventional beer or soft drink cans to form a package of the group. Such cans have top and bottom beads or chimes. In FIG. 14 three such cans 251, 252, 253 are shown in the carrier 200. The carrier restricts the cans to a similar orientation such that their chimes are in tangential contact with adjacent containers. In application the cans are placed in proper orientation in two rows on either side of central hinge line 201. Handle 230 and attaching band 233 are then pulled upwardly about the cans and inwardly toward each other, as shown in FIG. 13, until outer girdle bands 248 and 249 of the second girdle planes pass beyond the central line of the can row and constrict about the upper zone of the can periphery. The tabs 225 are thus forced into contact with the upper surface of each can, restricting the cans vertically between tabs 225 and the carrier floor.

Hinge line 201 is the effective articulating joint between the floor or tabs 215 and the first girdles of the first girdle planes. Scored hinge lines 202 and 203 are an effective securing means articulately joining the bands of the first and second girdle planes on either side of the central plane of the carrier.

The band 233 and handle portion 230 may then be joined together along their width by applied adhesive layer 255, or means such as wire fasteners, or heat sealing.

Unlike the previous embodiments, the carrier of FIGS. 13–16 imposes restraint against vertical motion in either direction by means of the upper and lower tabs 225, 215. Like the previously described embodiment, the intersecting vertical score lines and the hinge lines 202, 203 result under tension in a semi-solid dihedral figure between the central can and the two outer cans of each row. These dihedral areas resist horizontal thrust and combine with the gripping action of the girdle bands on the peripheries of the cans at top and bottom to comprise an extraordinarily stable package with little risk of the chimes slipping from mutual tangency to damage the can wall. While the tension required to form the package is insufficient to tear the package material, it is sufficient to impose a substantial restriction upon the periphery of the containers therein. This restriction, while entirely adequate to sustain the weight of the containers, does not hinder their removal from the package.

Removal is accomplished, as illustrated in FIG. 15, by placing the package on its side, lifting a tab 215A away from the can bottom and thrusting the can outwardly by pressure on its top through the enlarged aperture made by the displacement of the bottom tab. One or more cans may be removed from the carrier without substantial effect upon the tension grip imposed upon the remaining containers in the carrier.

This particular carrier, like previous embodiments, is economical to form and lends itself to space saving in refrigerator storage since it may be placed upon its side. This orientation also facilitates removal of one or two cans by a consumer when less than a full package is desired.

The alternate embodiment shown in FIG. 17 comprises a bottle carrier 261 substantially similar to the can carrier shown in FIGS. 13–16. The carrier is preferably made from a flat sheet of plastic material and may be combined with any even number of so-called "stubby" bottles to comprise a package of two bottle rows. Each opposed bottle pair, such as the bottles 263, 264 of FIG. 17, has a bottom floor tab 265 that restrains vertical motion when the package is first lifted. First girdle bands 267 are hingedly secured to the bottom tabs and extend upwardly and outwardly about the bottle periphery. Second girdle bands 269 are hingedly secured to the first girdle bands and extend about the major diameter of the bottle at its outer portion with respect to the center of the carrier and about the diminishing diameter portion near the center of the carrier.

Like the previous embodiment, the carrier of FIG. 17 is combined with containers by a wrap process. The containers are properly oriented upon tabs 265 and handle portion 271 and attachment portion 272 are brought up and around the oriented containers and joined together between bottle rows. Considerable tension is engendered within the carrier members during application. The tension forces restrict the girdle bands against the container peripheries and securely hold them in place with respect to one another. Additional stability for the package is assured by upper tabs 275, similar to the tabs 225 of FIG. 13. As can be seen from FIG. 17, the tabs spring into contact with the bottle neck when the carrier is raised about the containers. The free end of the tab preferably registers beneath the crown cap 277 of each bottle, further resisting downward motion of the bottle with respect to the carrier.

Each bottle may be removed individually from the carrier by placing the carrier on its side, disengaging tab 275 by pressing it toward the handle and then bending back lower tab 265 and pressing the bottle outwardly through the aperture enlarged by deformation of tab 265.

The configuration of the aperture (not shown) of the embodiment of FIG. 17 is indicated with respect to the lay-out for the embodiment of FIG. 13 by the dotted lines 278, 279 in each of the apertures of FIG. 16. The dotted lines indicate that the material between the apertures of the lower girdle bands is increased in thickness at the juncture of the floor tabs 215 with the aperture periphery. This additional material adds to the floor support which is essential to carrier stability prior to the application of tension when the handle is lifted fully.

The embodiments illustrated by FIG. 10 and FIG. 13, while differing in the number of girdles which grip the container periphery, are similar in their operating principle. The embodiment of FIG. 10 is preferably loaded while the carrier is folded flat in accordion-like fashion along its hinge lines. The bottles are guided into the girdle apertures of the carrier not only by the dropping or inserting machinery, but also by the orientation of tabs 149. The carrier becomes a tension device when the weight of the containers within is imposed upon the structure when the handle is lifted. Conventional assembly line cases may be adapted to hold the carrier in compressed or flat condition. It may develop that a partially expanded carrier condition is more conducive to successful loading. In such case a stiffer material, such as polystyrene, may be utilized for the carrier.

The embodiment of FIG. 13, while combined with its containers by wrapping procedure, is also a tensioned structure once the containers are raised by the carrier handle. The peripheral contact between container and the girdle apertures results in a grip that supports the containers with little or no load imposed upon the floor tabs.

An alternate embodiment of the invention adapted to combine with "stubby" bottles is shown in FIGS. 18–20. In FIG. 20 the layout for cutting and scoring the flat sheet from which the carrier is preferably made is shown. A flat sheet 281 is divided by horizontal hinge lines 283 and 284, 285 into opposed girdle planes. The sides of the sheets are shaped in undulating fashion for the same reasons described with respect to the embodiment of FIG. 13.

Girdle planes 287, 288 on either side of central hinge line 283 form the first and second girdle planes of the carrier. Each has three aligned girdle apertures 291, 292, 293 and 295, 296, 297 respectively. Apertures 291 and 295 are aligned on either side of hinge line 283. Apertures 292, 296, and 293, 297 are similarly aligned. In each instance a floor tab 299 projects into the space of each of the girdle aperture. The floor tab in each of the first girdle planes projects away from hinge line 283. A score line 301 extends from the extremes of the aligned tabs of each opposed aperture pair. While the aperture configuration may be substantially circular, preferably the cut-out pattern is slightly elliptical with the long axis of each ellipse being perpendicular to hinge line 283. The second girdle planes 302, 303 extend respectively from hinge lines 284, 285 of the carrier. Each of the second girdle planes has a row of girdle apertures 305, 306, 307 and 309, 310, 311, respectively. Each of these apertures is aligned substantially with its counterpart aperture in a first girdle plane on either side of hinge line 283.

A substantially elliptical loop tab 313 protrudes into the space of each aperture 305, 306, 307. The periphery of the loop tab is less than the periphery of the girdle aperture so that an increment of space exists in the flat pattern between the loop tab and the aperture periphery. A substantially elliptical center hole 315 resides in the center area of each loop tab.

In the second girdle plane opposite hinge line 285, a loop tab 318 occupies the central portion of the apertures 309, 310, 311 of that girdle plane. Each loop tab 318 has a substantially elliptical or oval center hole 319.

Loop tabs 318 differ from their counterpart loop tabs 313 in that each extends perpendicularly to hinge lines 283, 285, for approximately the entire length of the girdle apertures 308, 310, 311. The reason for the greater extent of tabs 318 is because of loading procedure described later on.

A scored hinge line 321 extends across the root of each loop tab. Similar score lines 322 extend from end to end of the carrier sheet between finger grip cut-outs 323 and each of the attachment portions 325, 326 at opposite ends of the carrier sheet. Scored hinge lines 328, 329 extend across the sheet to define the articulated attachment between the second girdle planes and the attachment portions.

In FIGS. 18 and 19 the carrier sheet 281 of FIG. 20 is shown combined with six containers. The bottles are disposed in two rows of three bottles each. A bottle, 331, 332 of each row is shown in FIG. 18. Three containers or bottles, 332, 333, 334 are visible in FIG. 19. Bottles 331 and 332 reside in girdle apertures 293, 307 and 297, 311, respectively. The neck of container 331 is surrounded by a loop tab 318, while the neck of container 332 is surrounded by a loop tab 313. Each of the containers in the two rows of the package shown in FIGS. 18 and 19 is similarly grasped by the peripheral walls of the various girdle apertures and by a loop tab.

To assemble the package shown in FIGS. 18 and 19, the bottles are placed upon flat carrier sheet 281, three bottles on each side of hinge line 283. Each container is centered on a score line 301. In this orientation the containers are supported by the tabs 299 and by a portion of the carrier sheet area immediately around each of the girdle apertures in the first girdles. After the bottles are oriented upon the flat sheet, attachment portions 325 and 326 are grasped either manually or by automatic machinery and pulled upwardly about the bottles until the first girdle surrounds the bottles in the manner shown in FIG. 18 with respect to the apertures 293 and 297. Then the attachment portions are pulled toward the center of the package between the rows of three containers.

Loop tabs 313 are the shorter and are applied first. They are grasped and bent over attachment portion 325 and looped downwardly about the necks of the containers 332 through 334. When this attachment is made, the opposite attachment portion 326 is pulled inwardly toward the center of the bottle rows and downwardly between the bottles. Note that this action contacts 360° of the container periphery with the girdle aperture of the second girdle. At this juncture the overlapping areas of the two attachment portions 325, 326 may be sealed together, either by conventional adhesives or by heat sealing or similar convenient method. After sealing, the loop tabs 318 are pulled over the necks of the containers opposite those which the second girdle 303 restrict.

The instant embodiment is a very tight package, the tension necessary to apply it acting to bind the girdle apertures firmly to the containers. The material used may be a linear polyethylene with the molecular alignment such that resiliency is greater in the direction of score lines 322. Note that the score lines 322, as shown in FIG. 19, cause a flat area 341 between adjacent bottles. Because of the score line and the creases therealong, this particular flat area is rigid in a horizontal line and resists compressive forces tending to force the bottles together. Adjacent bottles do not strike against each other even during rough handling.

A single bottle is easily removed from the package by bending a floor tab 299 back toward center hinge line 283 and pushing on the top of the bottle urging it toward the floor tab. Bottle motion in this direction releases the loop tab about the neck, freeing the bottle to slide outwardly through the aperture enlarged by displacement of tab 299.

In FIG. 21 an end elevation schematically represents an asymmetrical carrier that may be used to package unlike objects or containers. The containers are unlike in that container 351 on the left is shorter than container 352. Their diameters are also different, container 352 having a larger diameter. Each of the containers is initially supported in the package upon a common floor piece 354. First girdles 356, 357 project upwardly and outwardly from articulate attachment to the floor piece by hinges 359, 360, respectively. The hinges are represented by circles and may take any of the forms described previously in the detailed description. First girdle 357 is apertured to receive container 352 and first girdle 356 is apertured to receive container 351, the configuration of the apertures depending upon the shape of the right section of the container. Second girdles 362, 363 extend inwardly and upwardly to attachment to a handle 365. Preferably the second girdles are attached in articulated fashion to the lower portion of the handle so that the entire carrier may be folded flat when it does not have containers within it.

Second girdle 363 extends inwardly and upwardly directly from a hinge connection 367 articulately linking it to first girdle 357. However, second girdle plane 362 extends upwardly and inwardly from a hinge 369 spaced upwardly from the outer extremity of first girdle 356. A second hinge 371 links a riser portion 372 to the first and second girdles 356, 362. The vertical riser is necessary to compensate for the greater horizontal extent from the center of the package which the girdles 357, 363 have. Note that hinge 367 is horizontally opposite the center point between hinges 369 and 371 on the opposite side of the package. In order for the carrier of FIG. 21 to fold flat, riser 372 is preferably of a flexible material like the previously described materials of prior embodiments. Lifting the handle applies peripheral tension on the containers as the walls of the apertures of the girdles change their attitude with respect to a right section of the containers. Riser 372 may be used as "billboard" space for commercial messages germane to the material packaged.

FIG. 22 illustrates in an isometric view a carrier 380 made from malleable wire or similar tractable material. Carrier 380 has base loops 382, 383 from which diverging girdles 384, 385 extend upwardly and outwardly. Second girdles 388, 389 extend inwardly and upwardly from the outer portions of each of the first girdles 384, 385. A handle 391 of twisted wire extends upwardly from the second girdles. A finger loop 392 may be formed at the top of the twisted wire. The carrier of FIG. 22 may be made from a single wire in which the loops of each side of the carrier are formed in a flat pattern. Then the two portions may be twisted together at the bottom juncture of the first girdles 394, at the juncture of the first and second girdles 396, 397, and at the juncture of the second girdles 398. Wire or other material of the proper flexibility can thus be used to form a carrier in accordance with the invention. The juncture points may be fairly rigid in themselves, but the malleable wire flexes at the juncture points, enabling the girdles on both sides of the center of the carrier to change their attitude with respect to one another and with respect to the containers (not shown) therein so that upward tension upon the handle results in a restrictive force imposed by the girdle peripheries against the container walls.

While the wire from which the carrier 380 is made may be of circular cross-section, as shown in FIG. 22, it is preferred that a covered wire, such as that shown in cross section in FIG. 23 be used. In FIG. 23 a central wire core 402 is surrounded by adhered layers of flat plastic ribbon 404, 405. Thus a greater surface area is available to exert a friction grip upon the walls of the containers within the wire carrier. Covered wire such as that shown in FIG. 23 is commerically available and is largely used in gardening to tie plants to stakes, etc.

The invention has many facets, as has been shown by the several embodiments illustrative of the inventive concept. Each of the embodiments shown has its peculiar advantages, but all are characterized by facility in manufacture and loading and economy of material utilized in their fabrication. Each embodiment, when combined with similarly oriented containers, whether the containers be similar or dissimilar, results in a package in which the containers are securely held, yet from which they may be easily removed. Containers are restrained from harmful contact one with another. The area adjacent horizontal hinge lines on sheet carriers may be printed or decorated. Other carriers within the concept of the invention will occur to those skilled in the art, therefore I wish the invention to be measured by the appended claims, rather than by the specific illustrative embodiments disclosed herein.

I claim:

1. A carrier and container package comprising a pair of containers arranged in side-by-side upstanding relation, a floor member for restricting downward motion of each container, said floor member having a central axis on opposite sides of which the containers are arranged, and engaging the bottom end of each container; a pair of first girdles articulately attached to the floor member adjacent the central axis thereof, the girdles sloping oppositely outwardly and upwardly from the floor member and each encircling one of adjacent containers on opposite sides of said central axis; a pair of second girdles articulately attached each to a first girdle on opposite sides of said axis, each of the second girdles sloping oppositely inwardly and upwardly from the first girdle and encircling adjacent containers on opposite sides of the axis; handle means located at the upper end of said carrier and connected to the inner upper ends of the second girdles so as to urge the outer ends of said gridles upwardly and inwardly whereby said girdles press the containers toward each other as upward displacement of the handle in opposition to container weight alters the attitude of the girdles wtih respect to one another, bringing the girdles into more restrictive relation to the peripheries of the containers.

2. A carrier for supporting a plurality of substantially cylindrical containers arranged in two parallel rows of about equal length, said carrier comprising a substantially flat floor member for supporting said containers by engaging the bottom ends thereof on opposite sides of a central axis of said floor member that is located about midway between the centers of said rows, a first plurality of pairs of girdles articulately attached to said floor member adjacent said central axis, each of the pair of gridles that are located on opposite sides of said axis sloping outwardly and upwardly from said axis and encircling adjacent containers that are on opposite sides of said axis, a second plurality of pairs of girdles articulately attached to the upper outer ends of the said first plurality of pairs of girdles, each girdle of the second plurality that are located on opposite sides of said central axis sloping upwardly and inwardly from such attachment and encircling adjacent containers that are on opposite sides of said axis, and a handle located at the upper end of said carrier and connected to the upper inner ends of the second plurality of girdles for urging said ends of said girdles upwardly and urging the upper outer ends of each of the girdles of said first plurality of girdles upwardly and inwardly, whereby said girdles grip said containers and urge them inwardly toward a central plane between said rows.

3. Apparatus in accordance with claim 2 wherein the means including a handle further comprises a third plurality and a fourth plurality of pairs of girdles articulately attached to the next lower plurality of girdles such that girdles are joined on opposite sides of the central axis alternately at upper inner and at upper outer edges of girdles symmetrically on opposite sides of the central axis; the third plurality of pairs of girdles sloping outwardly and upwardly from attachment to the second plurality and encircling adjacent containers that are on opposite sides of the axis; and the fourth plurality of pairs of girdles sloping inwardly and upwardly from attachment to the third plurality of pairs of girdles and encircling adjacent containers that are on opposite sides of the axis; said handle being attached at the juncture of the inwardly sloping fourth plurality of pairs of girdles at their upper edges.

4. A carrier and container package comprising similarly oriented containers of differing dimensions, a floor member common to both containers, a first girdle encircling the container of lesser height, a second girdle encircling the container of greater height, articulate means securing the first and the second girdles to the floor member, a third girdle encircling the first container above the first girdle, articulate means joining the first and third girdles at a point remote from the container of greater height, handle means rising from the third girdle, a fourth gridle surrounding the second container above the second girdle, a riser adapted to contact the exterior of the container of lesser height remote from the first container, means articulately linking the second and the fourth girdles to the lower and upper portions respectively of the riser, and means joining the fourth girdle to the handle at the juncture of the handle with the third girdle.

5. A carrier for supporting a pair of containers in side-by-side upstanding relation, said carrier comprising a floor member having a central axis defining two floor member portions each adapted to restrict downward motion of a container and engage the bottom end of a container; a pair of first girdles articulately attached to the floor member adjacent the central axis thereof, each of the girdles of the pair sloping oppositely outwardly and upwardly from the floor member and each adapted to encircle one of adjacent containers on opposite sides of said central axis; a pair of second girdles articulately attached each to a first girdle on opposite sides of said axis, each of the second girdles sloping oppositely inwardly and upwardly from the first girdle and each adapted to encircle one of adjacent containers on opposite sides of the central axis; handle means at the upper end of said carrier connected to the inner upper ends of the second girdles so as to urge the outer ends of said gridles upwardly and inwardly as upward displacement of the handle in opposition to the weight of containers in the carrier alters the attitude of the girdles with respect to one another, bringing the girdles into more restrictive relation to the peripheries of containers in the carrier.

6. A carrier and container package comprising a plurality of substantially cylindrical containers arranged in two parallel container rows of equal length, a substantially flat floor member adapted to support said containers and engaging the bottom ends thereof on opposite sides of a central axis of said floor member located about midway between said rows, a plurality of pairs of girdles articulately attached to said floor member adjacent said central axis, each pair of girdles that are located on opposite sides of said axis sloping outwardly and upwardly from said axis and encircling one of adjacent containers that are on opposite sides of said axis, and means including a handle located at the upper end of said carrier and connected to the upper outer ends of said girdles for urging said upper outer ends of each of said girdles upwardly and inwardly, whereby said girdles grip said containers and urge them inwardly toward a central vertical plane between said container rows.

References Cited by the Examiner
UNITED STATES PATENTS

| | | | |
|---|---|---|---|
| 1,568,550 | 1/1926 | Gottesman. | |
| 1,687,137 | 10/1928 | Myers. | |
| 2,094,744 | 10/1937 | Keith | 220—101 X |
| 2,200,813 | 5/1940 | Warren | 220—101 X |
| 2,522,950 | 9/1950 | Keith | 220—101 |
| 2,804,234 | 8/1957 | Lachance | 220—116 |

FOREIGN PATENTS

| | | |
|---|---|---|
| 241,443 | 10/1925 | Great Britain. |

FRANKLIN T. GARRETT, *Primary Examiner.*